US010800693B2

(12) United States Patent
Sievers (10) Patent No.: US 10,800,693 B2
(45) Date of Patent: Oct. 13, 2020

(54) METHOD AND ARRANGEMENT FOR WASTEWATER TREATMENT (71) Applicant: BMA Braunschweigische Maschinenbauanstalt AG, Braunschweig (DE)

(72) Inventor: Michael Sievers, Clausthal-Zellerfeld (DE)

(73) Assignee: Awama GmbH, Braunschweig (DE)

( * ) Notice: Subject to any disclaimer, the term of this patent is extended or adjusted under 35 U.S.C. 154(b) by 341 days.

(21) Appl. No.: 15/510,720

(22) PCT Filed: Sep. 23, 2015

(86) PCT No.: PCT/EP2015/071870
§ 371 (c)(1),
(2) Date: Mar. 13, 2017

(87) PCT Pub. No.: WO2016/046262
PCT Pub. Date: Mar. 31, 2016

(65) Prior Publication Data
US 2017/0275195 A1  Sep. 28, 2017

(30) Foreign Application Priority Data

Sep. 23, 2014  (DE) .......................... 10 2014 013 813

(51) Int. Cl.
*C02F 11/18*  (2006.01)
*C02F 11/04*  (2006.01)
(Continued)

(52) U.S. Cl.
CPC ................ *C02F 11/18* (2013.01); *C02F 1/20* (2013.01); *C02F 11/008* (2013.01); *C02F 11/04* (2013.01);
(Continued)

(58) Field of Classification Search
CPC .......... C02F 11/18; C02F 1/20; C02F 11/008; C02F 11/04; C02F 11/121; C02F 11/16;
(Continued)

(56) References Cited

U.S. PATENT DOCUMENTS 4,935,038 A    6/1990  Wolf
5,454,911 A *  10/1995  Rafferty ................... B27N 1/00
                                              127/37
(Continued)

FOREIGN PATENT DOCUMENTS

CA      2105613       3/1994
CN     104030537      9/2014
(Continued)

OTHER PUBLICATIONS

Machine-generated English translation of EP 0588138, generated on Jan. 10, 2019.*
Solid Waste Treatment and Recyling; ISBN 7-5025-4880-7; 2003.

*Primary Examiner* — Fred Prince
(74) *Attorney, Agent, or Firm* — Salter & Michaelson (57) ABSTRACT

The invention relates to a method and an arrangement for wastewater treatment, in which at least portions of the sewage sludge contained in the wastewater (0) are subjected to a hydrolysis (8). The hydrolysis (8) is carried out as a thermal hydrolysis. After the hydrolysis step (8), a drying process is (19) carried out. The drying process (19) is a process operating with positive pressure in the steam region. At least parts of the steam resulting from the drying process (19), which operates with positive pressure, are fed (20) to the portions of the sewage sludge in the thermal hydrolysis (8).

21 Claims, 9 Drawing Sheets

(51) Int. Cl.

| | | |
|---|---|---|
| *C02F 11/12* | (2019.01) | |
| *C02F 11/16* | (2006.01) | |
| *C02F 1/20* | (2006.01) | |
| *C02F 11/00* | (2006.01) | |
| *C05B 5/00* | (2006.01) | |
| *C05B 17/00* | (2006.01) | |
| *C05D 9/00* | (2006.01) | |
| *C02F 1/52* | (2006.01) | |
| *C02F 11/06* | (2006.01) | |
| *C02F 11/121* | (2019.01) | |
| *C05C 11/00* | (2006.01) | |
| *C02F 101/10* | (2006.01) | |
| *C02F 101/16* | (2006.01) | |

(52) U.S. Cl.
CPC ............ *C02F 11/121* (2013.01); *C02F 11/16* (2013.01); *C05B 5/00* (2013.01); *C05B 17/00* (2013.01); *C05C 11/00* (2013.01); *C05D 9/00* (2013.01); *C02F 1/5254* (2013.01); *C02F 11/06* (2013.01); *C02F 2101/105* (2013.01); *C02F 2101/16* (2013.01); *C02F 2301/063* (2013.01); *C02F 2301/066* (2013.01); *C02F 2303/10* (2013.01); *Y02E 50/343* (2013.01); *Y02W 10/23* (2015.05); *Y02W 10/40* (2015.05)

(58) Field of Classification Search
CPC ............ C02F 2301/066; C02F 2101/16; C02F 2303/10; C02F 2101/105; C02F 2301/063; C02F 11/06; C02F 1/5254; C05B 5/00; C05B 17/00; C05D 9/00; C05C 11/00; Y02W 10/23; Y02W 10/40; Y02E 50/343
USPC .................. 210/609, 774, 175, 903, 906
See application file for complete search history.

(56) References Cited

U.S. PATENT DOCUMENTS

| 5,888,307 A | 3/1999 | Solheim |
|---|---|---|
| 6,913,700 B2 | 7/2005 | Solheim |
| 7,101,482 B2 | 9/2006 | Chauzy et al. |
| 7,883,884 B2 | 2/2011 | Bonde et al. |
| 8,641,902 B2 | 2/2014 | Ewert et al. |
| 9,403,708 B2 | 8/2016 | Buchmuller |
| 9,556,049 B2 | 1/2017 | Ewert et al. |
| 2011/0114570 A1 | 5/2011 | Hojsgaard |
| 2012/0111515 A1 | 5/2012 | Nilsen et al. |

FOREIGN PATENT DOCUMENTS

| DE | 630 775 | 6/1936 |
|---|---|---|
| DE | 35 29 445 | 2/1987 |
| DE | 689 05 182 | 7/1993 |
| DE | 43 33 468 | 4/1995 |
| DE | 198 58 187 | 9/1999 |
| DE | 695 17 818 | 2/2001 |
| DE | 10 2008 013 980 | 10/2009 |
| DE | 10 2008 045 289 | 3/2010 |
| DE | 10 2009 014 776 | 9/2010 |
| DE | 10 2009 035 062 | 2/2011 |
| DE | 10 2009 049 181 | 4/2011 |
| DE | 10 2011 112 780 | 3/2013 |
| DE | 10 2012 014 357 | 9/2013 |
| EP | 0 588 138 | 3/1994 |
| EP | 0 784 504 | 7/1997 |
| EP | 1 198 424 | 4/2002 |
| EP | 1 230 167 | 8/2002 |
| EP | 1 320 388 | 6/2003 |
| EP | 1 527 022 | 5/2005 |
| EP | 2 457 649 | 5/2012 |
| JP | 5621700 | 2/1981 |
| JP | 5870896 | 4/1983 |
| JP | 06-190382 | 7/1994 |
| JP | 10506051 | 6/1998 |
| JP | 2003039036 | 2/2003 |
| JP | 2006167522 | 6/2006 |
| JP | 2009148650 | 7/2009 |
| JP | 2010179217 | 8/2010 |
| JP | 2010284589 | 12/2010 |
| JP | 2011516246 | 5/2011 |
| JP | 2012135705 | 7/2012 |
| JP | 2013180243 | 9/2013 |
| WO | 2009/112208 | 9/2009 |
| WO | 2013/163998 | 11/2013 |

* cited by examiner

METHOD AND ARRANGEMENT FOR WASTEWATER TREATMENT

TECHNICAL FIELD

The invention relates to a method for wastewater treatment, in which at least portions of the sewage sludge contained in the wastewater are subjected to a hydrolysis, in which the hydrolysis is carried out as a thermal hydrolysis, and in which, after the step of hydrolysis, a drying process is carried out.

The invention further relates to an arrangement for wastewater treatment, with a hydrolysis device for hydrolytic treatment of sewage sludge and a dryer for drying of sewage sludge.

BACKGROUND OF THE INVENTION

Sewage sludge generally accumulates during wastewater treatment. Sewage sludge is by no means only a detrimental byproduct, which needs to be disposed of, but rather instead represents a valuable energy source on account of its organic constituents and a plant nutrient source on account of the phosphate and nitrogen contained in it.

The energy content of sewage sludge can be utilized, on the one hand, by digestion thereof and utilization of the methane-containing digestion gas that is formed and, on the other hand, also by incineration of the dried sewage sludge and utilization of the resulting furnace gases. In this process, a combination of digestion and dewatering at one site as well as drying and incineration at another site results in a very high primary energy utilization. The primary energy use can be further increased by installing the four processes (digestion, dewatering, drying, incineration) at a common site, when the drying process occurs with excess pressure in the steam range and the ability to dewater the digested sludge is improved by pretreatment measures, in particular by thermal hydrolysis. This combination can be markedly improved yet again by dispensing with the digestion and by employing a monoincineration at the same site.

Hydrolysis is understood to mean the cleavage of a chemical bond by means of water. On account of the thermal hydrolysis, less water then needs to be vaporized during the drying of the digested sludge.

A thermal hydrolytic treatment of sewage sludge at temperatures of approximately 60° C. to 320° C. and a treatment period of approximately 10 minutes to 2 hours improves the ability to digest sewage sludge, so that, during the digestion, greater degradation of the organic portion of the sewage sludge and production of multiple gases occurs. As a result, a higher energy yield during the digestion as well as a smaller mass flow of sewage sludge to be dewatered is achieved.

Various proposals are already known from the prior art for a corresponding wastewater treatment. Thus, a method for treating biogenic residual masses, also including sewage sludge, has already been described in DE 43 33 468 C2. In this process, the sewage sludge is initially subjected to a digestion. Subsequently, the digested sludge is treated by means of thermal hydrolysis under pressure at temperatures of about 300° C. and afterwards returned to the digestion process. The heat required for the hydrolysis is supplied indirectly by means of a heat exchanger, with the hydrolysis gas itself or else the incineration of biogas being proposed as the heat source.

Known from DE 198 58 187 C5 is a method for treating sewage sludge. After treatment in a first anaerobic digestion stage, the sewage sludge is fed to the thermal disintegration process. The sludge leaving the thermal disintegration process is subsequently either digested in a second anaerobic digestion stage or fed back to the first anaerobic digestion stage. The heat for the hydrolysis is supplied indirectly by means of heat exchangers and, once hydrolysis has occurred, the heat is dissipated again also by means of heat exchangers.

Known from EP 1 230 167 B1 is a method for treating residual materials obtained from the animal processing industry. These residual materials, after addition of an alkaline substance, are subjected to a thermal hydrolytic treatment at 20° C. to 160° C. In further processing steps, there also occurs, among other things, a drying of a part of the residual materials at ambient pressure or in vacuum, with the exhaust vapors being discharged to the surroundings. Heat is supplied for a thermal hydrolysis indirectly by means of a heating apparatus.

A method for treating organic materials has been described in EP 1 320 388 B1. The organic material is initially cooked with lime, that is, CaO and/or $Ca(OH)_2$, at a temperature between 100° C. and 220° C. under pressure. The heat required for this is supplied indirectly. The cooked organic material is subsequently fed to a stripping unit, in which ammonia is stripped owing to pressure relief and, at the same time, dissolved orthophosphates are precipitated. Alternatively, the cooked material can be converted in part to biogas under anaerobic conditions prior to being fed to the stripping unit.

A method for sewage sludge treatment is described in EP 1 527 022 B1. In this process, the sewage sludge is subjected to at least one pretreatment step, in addition to which a thermal hydrolysis at 50° C. to 180° C. and a pressure of between 2000 hPa and 40,000 hPa occurs as well. The pretreated sludge is subsequently digested aerobically or anaerobically. Alternatively, the solids that remain in the sludge after the pretreatment are separated out and fed to a new thermal hydrolysis. The thermal hydrolysis occurs in an autoclave on small scale; that is, the heat is supplied indirectly.

Another method for treating sewage sludge is known from DE 10 2011 112 780 A1. The sludge is initially treated in a thermal or thermal-chemical hydrolytic process. Subsequently, dissolved orthophosphate is separated from the sludge. Afterwards, the remaining sludge is digested anaerobically in the digestion tank. The supply of heat for the thermal hydrolysis in this process can occur indirectly via heat exchangers and/or directly by means of steam injection. After the hydrolysis and prior to the separation of phosphate, the sludge is cooled by means of a cooling apparatus.

Known from DE 10 2009 014 776 A1 is a method for the thermal hydrolysis of organic materials. The heat for the thermal hydrolysis is transferred or removed indirectly by means of heat exchangers, that is, by means of heating and cooling elements. In this process, a medium is circulated between the heating element and the cooling element.

The heat required for the hydrolysis is transferred indirectly to the medium in this process.

Thermal energy is additionally required for the thermal hydrolysis in all of the known methods mentioned. In the process, it is also often taken into account that this thermal energy is taken from a part of the multi-gas production from the digestion or from the waste heat of the digestion gas combusted in a combustion engine, that is, ultimately from the thermal energy that is created in the method itself. Nonetheless, it would be possible in many cases also to utilize this thermal energy in a different way and there is considerable interest in employing additional thermal energy at least effectively for the thermal hydrolysis.

In this case, an indirect transfer of heat is actually less preferable, even though this is carried out in this way in all of the aforementioned proposals. The heat transfer via indirect pathways is markedly unfavorable and less effective and, moreover, exhibits the drawback that it strongly limits the maximum possible solids concentration in the sewage sludge. If the solids concentration were chosen to be higher in an indirect heat transfer, the heat transfer would be even poorer, because the viscosity of the sludge increases with increasing solids concentration.

In order to avoid these drawbacks, it has already been proposed in DE 10 2008 013 980 B3, in a method for sewage sludge treatment, to supply the heat required for the hydrolysis either indirectly by means of heat exchangers or else directly by means of steam injection. In addition, this proposal already entails the notion of treating only the so-called surplus sludge of the sewage sludge by way of thermal hydrolysis and subsequently carrying out digestion anaerobically in a digestion tank. The hydrolyzed surplus sludge is thus digested separately.

In a method known from EP 0 784 504 B1 for the hydrolysis of organic materials, a thermal hydrolysis of organic material, such as, for example, wastewater sludge, likewise occurs by means of steam. Besides an indirect heating of the organic material by means of heat exchangers, a direct process in a pressure tank is also described, in which the steam is fed from the bottom into the pressure tank and raises the temperature.

In EP 1 198 424 B1, a direct supply of steam is also proposed in a method for treating sewage sludge in a hydrolysis reactor. In this process, the organic material is initially heated to a temperature approaching 100° C. and subsequently mixed with steam at an absolute pressure of 1,000 hPa to 4,000 hPa in a mixer and carried into a preheating tank, where it is subsequently brought to an absolute pressure of 3,000 hPa to 10,000 hPa and then carried into a hydrolysis reactor. Once hydrolysis has occurred, the pressure is relieved in a pressure relief tank to 1,000 hPa to 4,000 hPa. A separation of steam and sludge occurs at this pressure and subsequently, if need be, a further cooling of the sludge occurs. In this method, the heat for the preheating to approximately 100° C. is supplied indirectly by means of heat exchangers and directly by means of steam injection for the further heating to above 100° C. In order to reduce the heat requirement or the steam requirement, the steam is separated from the pressure relief tank and either returned to the first heat exchanger and/or mixed with the sludge in a mixer.

These proposals, which entail a hydrolysis operating with steam injection, require one steam boiler in each case for generating steam. This is a major drawback, since the water that is to be vaporized needs to meet high requirements in terms of purity, so that deposits in the steam boiler and damage to the steam boiler are prevented. A water quality that meets these purity requirements can usually be ensured only by way of additional processing of drinking water or by means of well-processed industrial water and hence leads to additional costs and risks and naturally also to the problem posed by any additional failure of the steam boiler, in the event of damage that nonetheless occurs. Moreover, the water that is to be vaporized remains in the sludge and therefore must be continually supplied.

In spite of the advantages that are offered by a direct steam injection in the step of thermal hydrolysis during wastewater treatment, these proposals therefore continue to encounter practical objections and they have not been implemented to the desired extent. Operation with a proven conventional indirect supply of thermal energy continues to be used unchanged for thermal hydrolysis, and the drawbacks outlined above are taken into account.

A method for the simultaneous utilization of the energy and material of wastes is known from DE 10 2008 045 289 A1. In it, a metallurgic method for the simultaneous utilization of the energy and material of inorganic and/or organic wastes is employed by producing energy-rich gases, while, at the same time, recovering recyclables in one process step. The furnace gas of high heat value that accrues during the monoincineration at approximately 2000° C., and that contains 10.5% $H_2$ and 19% CO can be utilized by way of post-incineration for generating steam for a high-temperature drying process.

In practice, there exists the desire of putting forth additional proposals for improving wastewater treatment, which make possible a more effective operation and/or open up further fields of application.

SUMMARY OF THE INVENTION

This object is achieved in a generic method by means of the present invention in that the drying process is a drying process that operates with excess pressure in the steam range, and in that at least parts of the steam resulting from the drying process operating with excess pressure in the steam range are fed to the portions of the sewage sludge in the thermal hydrolysis.

In a generic arrangement, this object is achieved by means of the present invention in the dryer is a dryer that operates with excess pressure in the steam range, in that a feeding device for feeding the steam, which results from the dryer operating with excess pressure in the steam range, to the hydrolysis device is provided, and in that the hydrolysis device is constructed so that it mixes the supplied steam together with the sewage sludge.

In accordance with the invention, it is proposed that the step of drying, which is provided already generally in conventional methods, is carried out by a steam drying process. The exhaust vapors formed during this steam drying process are then carried to the hydrolysis stage. In the process, the sewage sludge can be heated by the exhaust vapors and hydrolyzed. At least a part of the exhaust vapor is thereby condensed and thus leads to a direct heating of the sewage sludge to the desired hydrolysis temperature.

Sludge constituents also enter the exhaust vapors during steam drying. The condensate from the steam drying thus contains additional constituents that have an influence on the hydrolysis. This influence is clearly different from the case when steam without such constituents is employed for the intended thermal hydrolysis, as happens in steps of a drying process provided for in conventional methods without the steam drying according to the invention.

This entirely new influence, which ensues from the invention, leads to a marked improvement in the efficiency of the hydrolysis on account of the constituents extracted by means of the steam drying. In contrast to a digestion of conventionally hydrolyzed sludge, a faster or higher gas or methane yield is achieved. In trials, it has already been found that this improvement can definitely be about 15% for a digestion period of 7 days.

Moreover, the steam discharged from the drying process—that is, in this case, specifically the exhaust vapors containing the additional constituents mentioned—can advantageously be compressed to the pressure required for steam injection in a thermal hydrolysis. Alternatively, this offers the possibility of carrying out the steam drying at elevated pressure and of conducting a direct steam injection without any additional compression.

Especially preferably, the object posed is achieved in accordance with the invention in that the drying process is a vortex or fluidized bed drying process with excess pressure in the steam range.

In this preferred embodiment, a novel combination of thermal hydrolysis and fluidized bed steam drying process is created. The vapor discharged from the fluidized bed steam drying process is carried into the hydrolysis reactor. The pressure and temperature levels as well as the quantity of steam can be adjusted yet further, if need be, by way of additional conditions, to the respective prevailing conditions of the hydrolysis.

The improvement of the hydrolysis already mentioned above through a different composition of the exhaust vapor in comparison to conventional steam is approximately 15% in relation to the digestion gas yield or an approximately 50% reduction in relation to the required volume of the digestion tank. Under appropriate drying conditions, the utilization of the exhaust vapor from the preferably employed, closed fluidized bed steam dryer is thus especially advantageous.

The composition of the vaporous exhaust vapor that can be achieved in a drying method with closed steam circulation and at excess pressure surprisingly shows these advantages. The temperature in the fluidized bed steam dryer is approximately 150° C., as a result of which, in addition, a hydrolysis of the constituents of the vaporized water occurs during the drying. This is a marked change in comparison to steam dryers operated at atmospheric pressure or not at excess pressure, in which such a hydrolysis does not occur.

The fluidized bed steam drying leads to a targeted alteration in the vapor composition, which makes it possible to improve the thermal hydrolysis for increased energy recovery and is not comparable to that obtained by conventional methods.

The steam is not, as conventionally described, carried directly to a thermal hydrolysis, but rather initially to the fluidized bed steam drying or vaporization process, so as to be supplied then, together with the constituents extracted from the sewage sludge, to the thermal hydrolysis. The method according to the invention thus also entails a double utilization of the steam, the advantages of which can be obtained only through the utilization of a fluidized bed steam drying in this form.

It is especially advantageous that a steam boiler is no longer required. This means that it is possible to dispense with substantial cost in terms of apparatus. Moreover, purified water treatment for steam generation is no longer required. This means that the operator of the wastewater treatment plant need no longer be concerned with the high requirements for purified water treatment. Neither is it necessary to provide for purified water treatment, nor is maintenance thereof required, nor is it essential to take into account beforehand any down times due to maintenance and repair in any form.

Another advantage lies in the fact that there is no longer any consumption of process water. This saves costs and it also spares the provision and monitoring of corresponding capacities.

It is also possible to dispense with a heat exchanger for condensation of the discharged steam, which usually had to be employed in conventional installations, with no replacement necessary.

Likewise, neither a preheating heat exchanger nor a cooling heat exchanger is needed. Overall, this results in simpler operation and less apparatus engineering.

These advantages also arise for a steam dryer of a different type, but fluidized bed steam dryers have proven especially useful and they offer further advantages. Fluidized bed steam drying in adaptable form is known from EP 2 457 649 A1, for example. It is described there in connection with the fluidization of sugar particles, in particular, in the sugar industry, but it can also be employed, when the parameters are appropriately adjusted, for the drying of sewage sludge. This has already been tested on a pilot scale and functions outstandingly. An outstanding functional operation is afforded through a combination with thermal hydrolysis.

Another method for the combination of a fluidized bed drying process—in this case, in connection with a gasification of moist combustibles—is described in DE 10 2009 181 A1. In this case, moist combustibles are described as being certain fractions from the processing of wastes and residual materials that have higher cellulose contents as well as biomasses of primary and secondary origin. In order to be able to employ a fluidized bed dryer, it is necessary beforehand to preheat the fluid combustible indirectly by means of a heat exchanger, because a direct contact of the condensate would lead to an undesired elevation in the moisture content of the combustible. The use of a fluidized bed dryer in the post-treatment of sewage sludge from wastewaters is neither conceived nor possible with such a known method.

In an especially advantageous embodiment of the present invention, it is possible to dispense totally with any indirect preheating of the sewage sludge, which is to be hydrolyzed, by means of a heat exchanger. This applies, in particular, in the case when an adequate quantity of steam is available and the steam is not otherwise needed. All auxiliary apparatus, such as heat exchangers, pipelines, and pumps, can then be dispensed with. The investment and operational costs are thereby substantially reduced.

Moreover, this proposed method is also more robust and easier to handle in terms of operating technique. This is due especially to the fact that a direct condensation of the steam introduced by means of steam injection prevents the conventionally occurring problems, such as, for instance, biofouling, scaling, and leakage, as well as additional operations, such as, for instance, any cleaning of heat exchanger surfaces.

It is also especially advantageous that the method according to the invention does not need any fresh water. Thus, not only are the requirements, already mentioned above, of making provision for a steam boiler or another steam generating unit dispensed with, but there ensue also other operational advantages as well as advantages in terms of conserving resources due to the saving of water.

Another advantage is that, besides the desired hydrolysis of the sewage sludge, also a condensation of at least a part of the exhaust vapor occurs. As a result of this condensation, vaporization enthalpy is liberated and a large part of the thermal energy consumed beforehand during the steam drying process is recovered. In this way, moreover, there also ensue further energy savings or, alternatively to this, equivalent savings in $CO_2$.

The condensed exhaust vapors obtained can then also remain advantageously right in the anaerobic digestion and are thus further treated in an integrated manner. The organic constituents of the condensed exhaust vapor are also digested in this process at least in part and transformed into additional energy.

In a series of embodiments, it is provided that, with the portions of the sewage sludge subjected to thermal hydrolysis, a digestion is subsequently carried out.

For this, it is possible to provide digestion tanks, in particular. Digestion tanks and digestion stages, as described in the introduction, are also known as such from the prior art and it is preferred to provide for such a digestion also in the variants according to the invention. However, it is also possible to implement embodiments of the invention without any digestion tanks and without any digestion subsequent to the thermal hydrolysis.

In another preferred embodiment, it is provided that a recovery of phosphorus is carried out from the sewage sludge fed to dewatering.

This measure has the advantage of also supplying plant nutrients, which are contained in the sewage sludge, for appropriate and effective utilization. These plant nutrients can be recovered from the water of the sewage sludge by phosphate precipitation and nitrogen separation, but also by recovery methods from the sewage sludge ashes, that is, from the residues of the incineration of sewage sludge. Furthermore, it is also possible to utilize as fertilizer the phosphate-containing slag obtained in a high-temperature monoincineration.

Known from DE 10 2012 014 357 B3 is such an embodiment that provides a material and/or energy utilization of a phosphorus-containing sewage sludge by means of melt gasification in metallurgical shaft furnaces. In this case, the phosphorus compounds that enter the gas phase are separated and made useable by metallurgical material recycling.

In another embodiment, the heat emitted from the pressurized exhaust vapor can be flexibly used in the sense that it is employed for water treatment, the vapor stripping of process water, mechanical dewatering, the operation of microturbines, and the distillative enrichment of salt-containing water.

In an additional embodiment, the energy flows in one sewage treatment plant and between a plurality of sewage treatment plants can be made flexible in the sense that a storable and transportable storage medium in the form of dried sewage sludge is produced. In this case, the dried sewage sludge from smaller sewage treatment plants can be transported economically and incinerated jointly at the site of a larger sewage treatment plant.

An embodiment of the invention consists in an arrangement for wastewater treatment, for which no digestion tank is provided. In this case, the dried sewage sludge is fed to an incineration installation, in particular a monoincineration installation or a waste incineration installation or a melt vitrification installation. The furnace gases of high incineration value that are formed can be utilized in a post-incineration process for steam generation for a high-temperature drying process and/or for electric power generation. Also possible is a utilization in cement plants or in coal-fired power plants or other installations. For a combination of drying and incineration, electric power is an especially decisive product in terms of economy. This embodiment leads to an adjustment of the method, which ultimately serves to increase the electric power output.

In other embodiments, the principle according to the invention is applied not only to sewage sludge, but also to liquid manure and cooking waste.

DESCRIPTION OF THE DRAWINGS

Further advantages of the invention will be presented in the dependent claims as well as in the following description of the figures.

In the following, several exemplary embodiments of the invention will be described in detail on the basis of the drawing.

Shown are.

DETAILED DESCRIPTION

Figure 1:
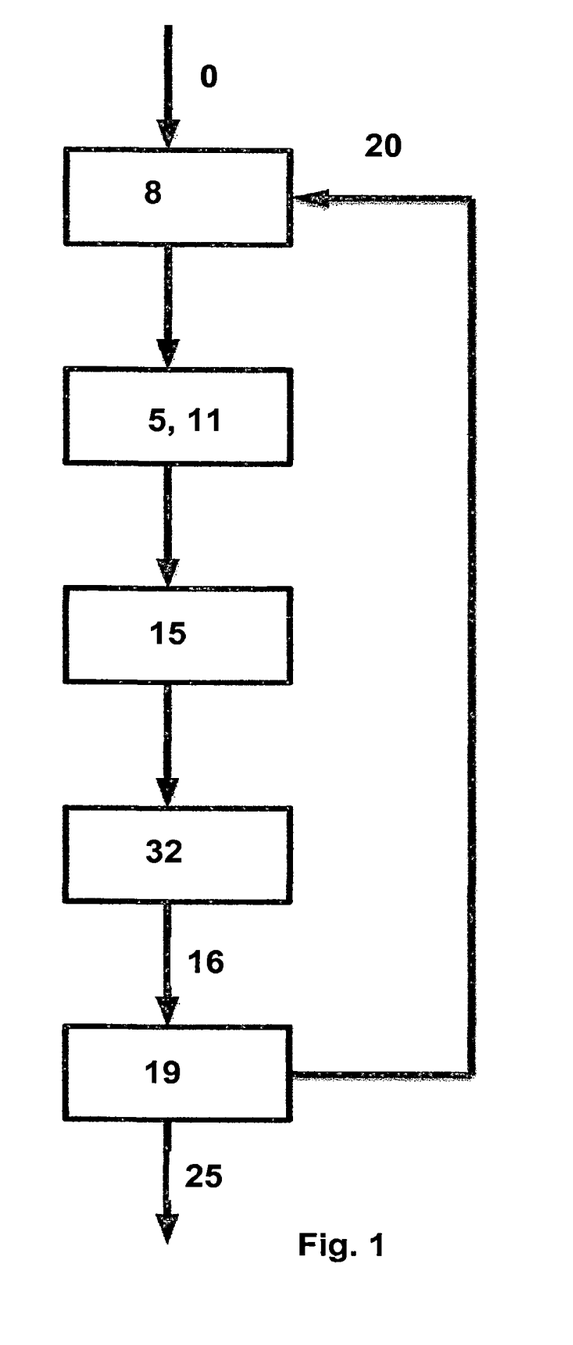
FIG. 1 a flowchart for the process sequence of a preferred embodiment of the invention.

Presented in FIG. 1 for clarification of the invention is a process sequence in a schematic and especially simplified illustration. What is involved here is an embodiment that already also comprises several non-essential method steps in order to be able to illustrate the approximate sequence in an especially simple manner.

Supplied in a first method step is sewage sludge, which is obtained from wastewater and may have been subjected beforehand to a preliminary treatment 0, perhaps also to an aeration and a post-treatment.

Municipal wastewater may be involved, but also wastewater from industrial installations, such as, for example, those of the sugar industry.

The sewage sludge from the preliminary treatment 0 and any further stages is then fed in the form of a surplus sludge or raw sludge to a hydrolysis 8. In this case, a thermal hydrolysis takes place in the hydrolysis reactor.

The thermal hydrolysis is a proven treatment method for sewage sludge that is contained in wastewater, and improves the digestion and dewatering thereof. The hydrolysis temperature varies in this process from about 100° C. to about 200° C. The thermal energy required for attaining this hydrolysis temperature is transferred either indirectly by means of a heat exchanger or, as in the embodiment of the invention, directly by means of steam. In order to conserve thermal energy, the sewage sludge can be thickened prior to the hydrolysis. The drawbacks of indirect heat transfer by means of a heat exchanger in comparison to direct heat transfer are avoided also with the illustrated embodiment of the invention. These drawbacks consist in the fact that, during an indirect heat transfer, the thickening of the sewage sludge is limited to at most approximately 6% to 7% dry matter on account of the increasing viscosity. This limit is eliminated by the direct heat transfer, since it makes possible a degree of thickening of the sewage sludge to approximately 10% to 15% dry matter.

However, the embodiment described makes it no longer necessary to employ the additional components and operating materials that have hitherto countered a direct heat transfer, such as, for example, steam generators and appropriately processed water for operation of the steam generator without any disruption. This means that the extensive safety regulations for operation of the steam boiler, which hitherto made a use thereof of little advantage, are also no longer relevant simply owing to the total elimination of the steam boiler.

It is also possible to exploit the process-engineering advantages of steam heating in the thermal hydrolysis of sewage sludge and, at the same time, to avoid the existing drawbacks of additional components and operating materials.

The hydrolyzed sludge is fed to a digestion stage 5 or 11 and is digested there. The digested sludge thereby formed is then fed to a dewatering stage 15. There it is dewatered mechanically, for example. The sludge that is mechanically dewatered in this way is pelletized in a conditioning stage 32 or otherwise isolated and fed in the form of pellets or granulate via a line 16 to a steam dryer 19. During the steam drying in the steam dryer 19, a dried sewage sludge is formed, which can be utilized in terms of energy and material in a sewage sludge monoincineration installation, for example. Alternatively, the dried sewage sludge can also be processed to briquettes, which can be utilized in terms of energy and material in a melting plant.

The conditioning stage 32 (not illustrated) can also be arranged alternatively inside of the steam dryer 19. In this way, it is possible to achieve an advantageous loading of the steam dryer 19 and a prevention or reduction of odor emissions arising from conducting the closed process.

In particular, an exhaust vapor is formed during the steam drying in the steam dryer 19 and it is fed via a feed line 20 to the hydrolysis reactor 8 in accordance with the invention.

These further components, other than the exhaust vapor, are discharged using a transport system 25.

Figure 2:
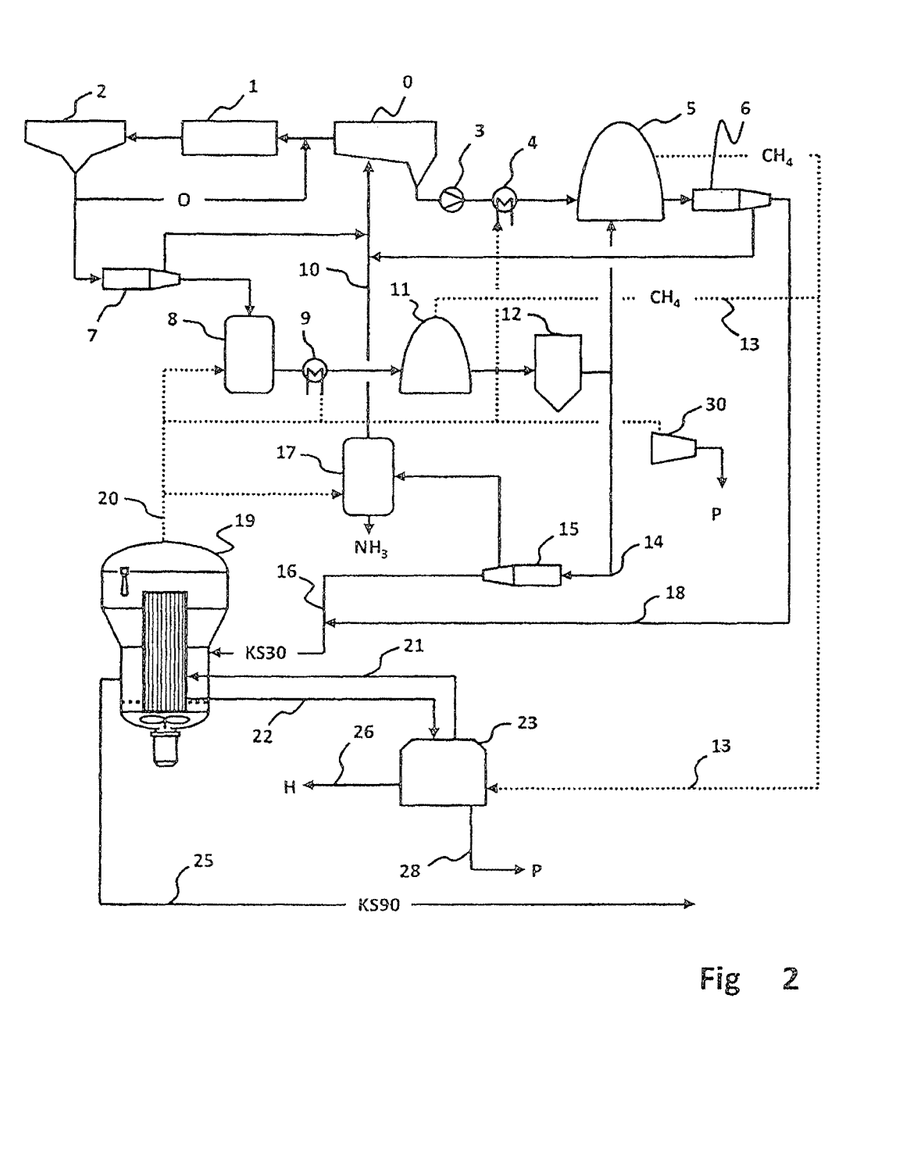
FIG. 2: an overview illustration of the construction of a first embodiment of a wastewater treatment plant according to the invention.

Illustrated in FIG. 2 is an overview of a first embodiment of the invention. In this case, central aspects are also the method steps and apparatus elements already illustrated in FIG. 1. The wastewater is initially subjected to a preliminary treatment 0, then to an aeration 1, and subsequently to a post-treatment 2. By means of a pump 3 and a heat exchanger 4, which is still present here, for heating, a part of the pretreated wastewater is fed to a first digestion tank 5 and, after digestion is complete, to a dewatering assembly 6 for primary sludge. The methane formed in the first digestion tower 5 is fed to a combined heat and power plant 23.

More interesting, however, is a second pathway, which, in this case, receives the sewage sludge after the post-treatment 2. What is involved here is the surplus sludge, which is fed to a preliminary dewatering assembly 7 and conveyed from there to a hydrolysis reactor 8. This hydrolysis reactor 8 is one of the central elements of the invention.

Also indicated is a pathway O, which stands for returned overplus or surplus and feeds back to the aeration 1 the part of the surplus sludge that is not fed to the preliminary dewatering assembly unit 7.

In particular, a dashed line 20 is seen, which leads to the hydrolysis reactor 8, which will be further explained later.

The sewage sludge is fed from the hydrolysis reactor 8, after passing through a heat exchanger 9 for cooling of the sewage sludge, to a second digestion tower 11. In said digestion tower, the hydrolyzed sewage sludge is digested. The methane formed is fed via another line 13, which is illustrated as a dashed line, also to the combined heat and power plant 23.

The digested sewage sludge form the digestion tower 11 then proceeds further into an MAP unit (magnesium-ammonium-phosphate unit) 12 and from there via a line 14 to a post-dewatering assembly 15 for the surplus sludge.

The centrate of the hydrolyzed surplus sludge is fed from the post-dewatering assembly 15 via a line to the stripping unit 17 and further treated there. The dewatered sludge from the post-dewatering assembly 15 is fed via a line 16 to a dryer 19. At this point in time, what is already involved is a dried sewage sludge containing about 30% dry matter.

The dryer 19 is a steam dryer or vaporization dryer, in particular a fluidized bed dryer.

The steam formed in said dryer is drawn off and, in particular, as already mentioned above, is fed directly to the hydrolysis reactor 8 and the sewage sludge present in it. The steam, the so-called exhaust vapors, in the feed line 20 is under pressure in this case and is correspondingly compressed and has a high temperature, which can be utilized directly for thermal hydrolysis in the hydrolysis reactor 8. In this case, the steam from the feed line 20 condenses in the hydrolysis reactor 8 and the substances contained therein can be utilized in the subsequently following steps, such as, for instance, the digestion in the digestion tower 11. Therefore, nearly no waste that cannot be utilized remains.

Parts of the steam or exhaust vapor in the feed line 20 can also be utilized for other purposes, such as, for instance by feeding it to the heat exchanger 4 or to the heat exchanger 9, where it can also be utilized for transfer of the energy contained therein.

A part of the exhaust vapor can likewise also be fed to a stripper 17. The stripper 17 contains, moreover, the ammonia-containing constituents from the post-dewatering assembly 15 and, after stripping, emits ammonia, which can be collected as a reusable material.

The mechanically dewatered sludge from the first dewatering assembly 6 for primary sludge can also be fed to the steam dryer 19, which is symbolized here by another line 18.

The combined heat and power plant 23, with its waste heat, can be utilized via a line 21 to supply the steam dryer 19 with a part of the energy required there. Conversely, the steam dryer 19 can feed the excess quantity of thermal oil or heating steam formed in it via a line 22 to the combined heat and power plant 23. Supplemental or alternatively to this, the steam dryer 19 can discharge a part of the exhaust vapor to a microturbine or small turbine 30 for electric power generation. This discharged energy or power P can be withdrawn from the process or else returned appropriately to another point and utilized.

The digestion gas from the two digestion tanks 5 and 11 is fed via a line 13 to the combined heat and power plant 23.

In addition, the combined heat and power plant 23 discharges additional waste heat 26 for further use at other points of the process or also for utilization outside of the process. This is indicated by the reference sign H. Furthermore, electrical power P is emitted via a line 28.

Finally, the substances dried in the steam dryer 19 leave it as dried sewage sludge containing 90% dry matter via a transport system 25.

Figure 3:
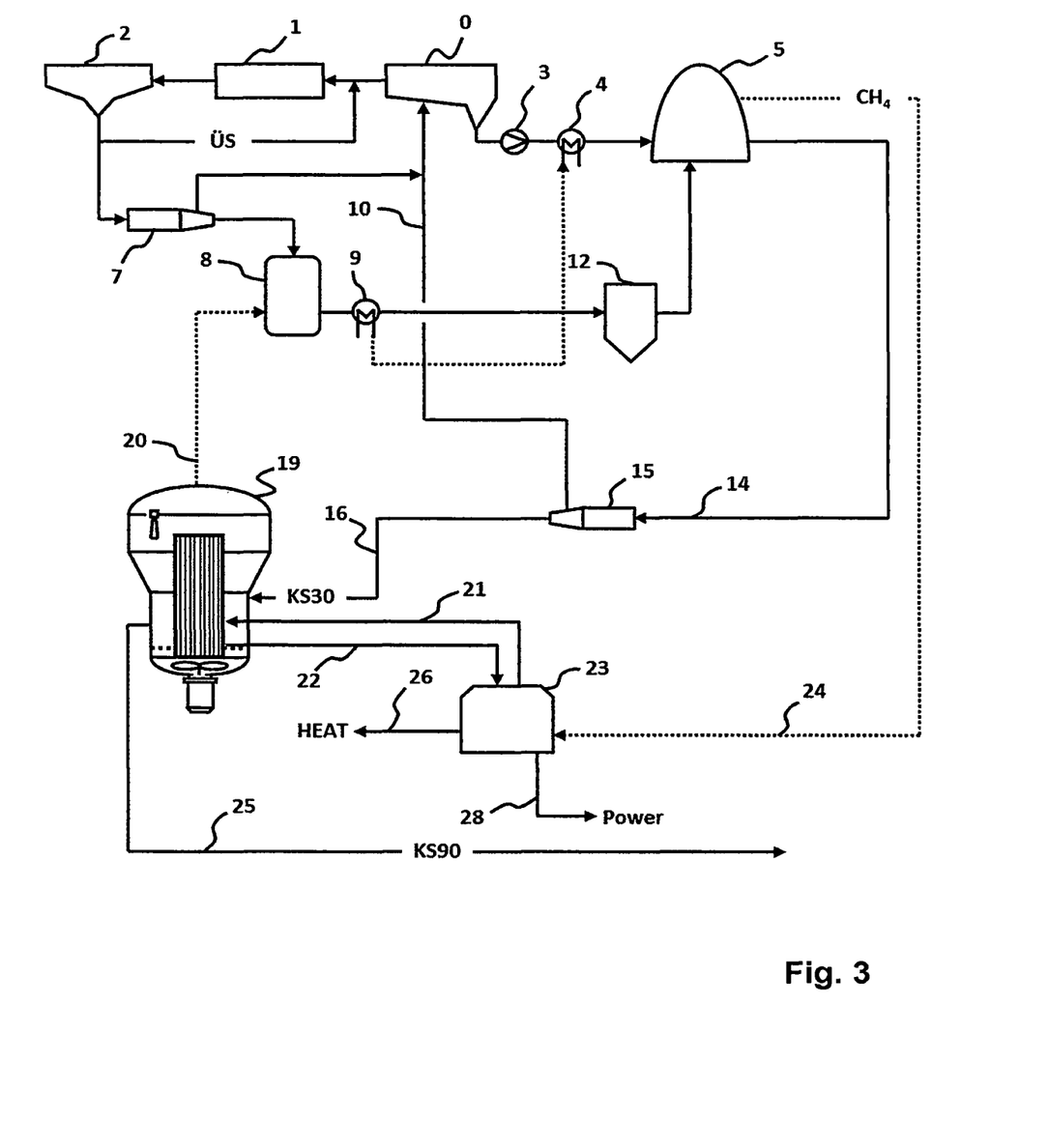
FIG. 3: an overview illustration of the construction of a second embodiment of a wastewater treatment plant according to the invention.

In a second embodiment illustrated in FIG. 3, several modifications of the first embodiment are made. Thus, in this case, a joint digestion of surplus sludge and primary sludge takes place, so that the second digestion tower 11 and the stripping unit 17 are dispensed with. For this, however, there is a separate hydrolysis 8 and MAP precipitation 12 for the surplus sludge.

In this embodiment, too, a fluidized bed dryer is provided as the steam dryer 19. In this way, the utilization of the exhaust vapors is also made possible via the line 20 in the hydrolysis 8.

Among the advantages of this embodiment are the production of lignite substitute fuel in the form of sewage sludge with a dry matter content of 90% in place of the conventional 30% without the use of additional fossil fuel energy and the utilization of waste heat of the combined heat and power plant 23 in the dryer 19 by means of thermal oil 22, similarly to the first embodiment.

Figure 4:
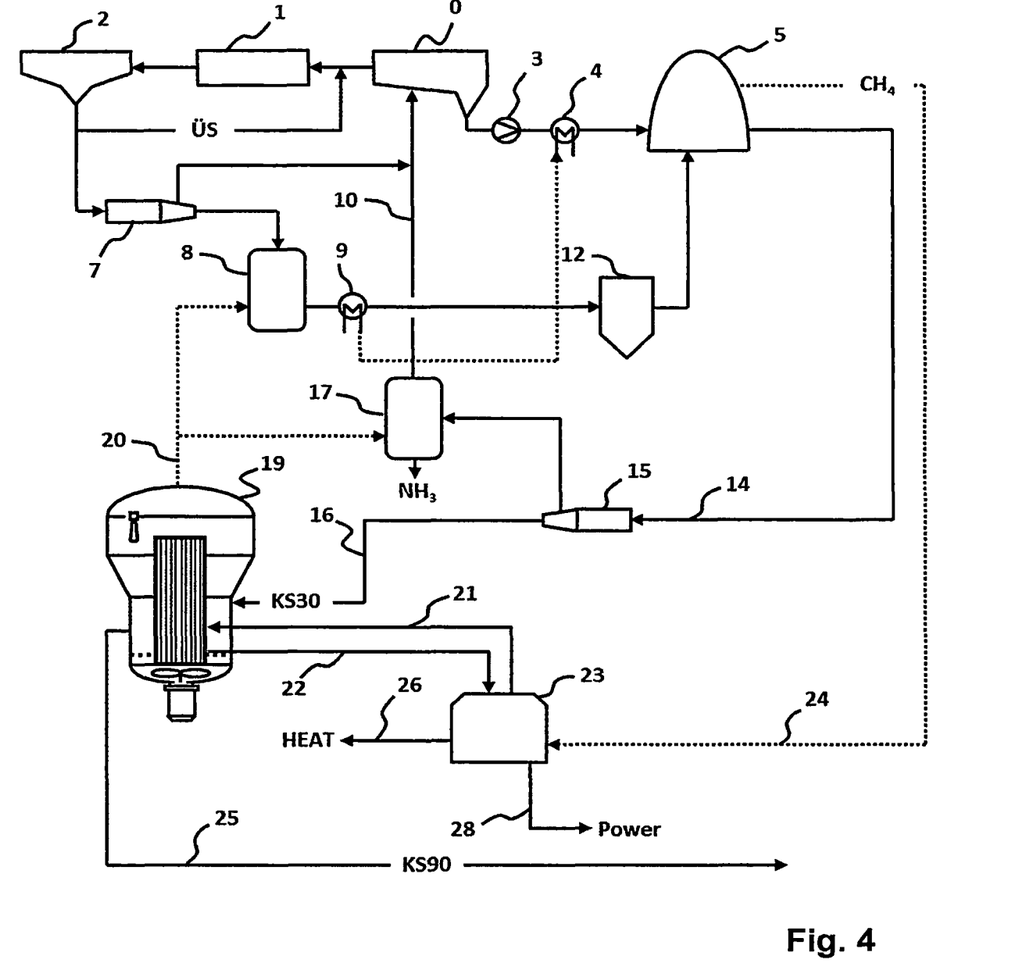
FIG. 4: an overview illustration of the construction of a third embodiment of a wastewater treatment plant according to the invention.

Illustrated in FIG. 4 is a third embodiment. In this case, a stripping unit 17 is included once again. In this way, the exhaust vapors from the fluidized bed dryer or the steam dryer 19 can be utilized via the line 20 additionally in the stripping unit 17.

The provided stripping unit 17 is not only a process water treatment, in which sludge water from a dewatering stage is treated, but rather, simultaneously, in which a processing of the exhaust vapor condensate takes place. In this way, advantages ensue in comparison to other drying methods, in which an additional condensate processing is required.

This also takes into account the fact that the exhaust vapors contain large portions of ammonium. This also applies to other embodiments below or above.

In addition to the second embodiment, another heat sink for the dryer 19 and the production of another reusable substance in the form of aqueous ammonia $NH_3$ are created.

Figure 5:
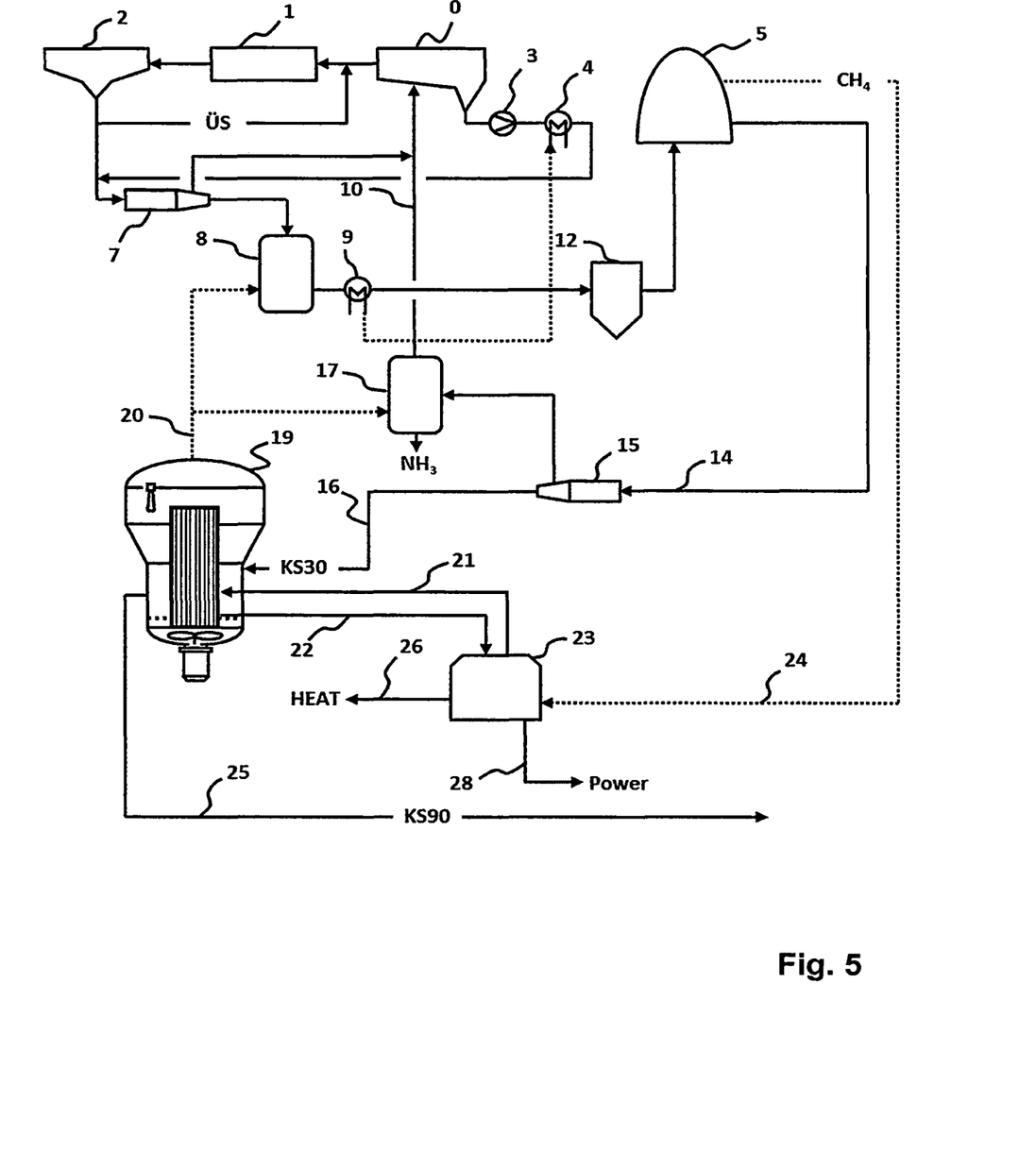
FIG. 5: an overview illustration of the construction of a fourth embodiment of a wastewater treatment plant according to the invention.

Presented in FIG. 5 is a fourth embodiment. In contrast to the second embodiment, a joint preliminary dewatering 7, hydrolysis 8, MAP precipitation 12, digestion 5, post-dewatering 15, and stripping 17 of the discharge from the post-dewatering 15 take place here.

Figure 6:
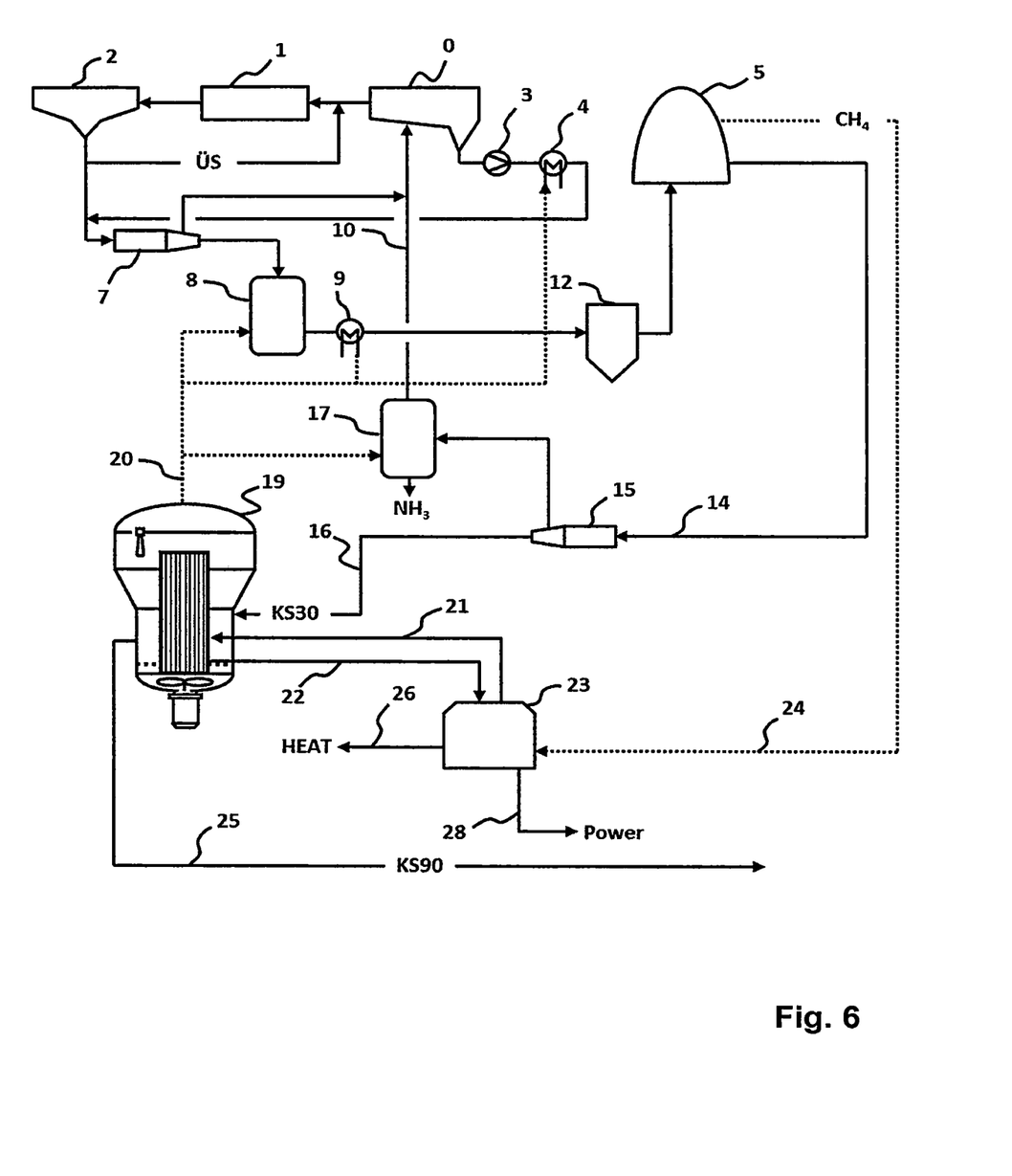
FIG. 6: an overview illustration of the construction of a fifth embodiment of a wastewater treatment plant according to the invention.

Illustrated in FIG. 6 is a fifth embodiment. Additionally to the fourth embodiment, a heating of the primary or raw sludge by excess exhaust vapors from the drying 19 takes place, said exhaust vapors being fed by means of the feed line 20.

To be noted as an advantage is a marked improvement in the ability to dewater and also small mass flows.

Figure 7:
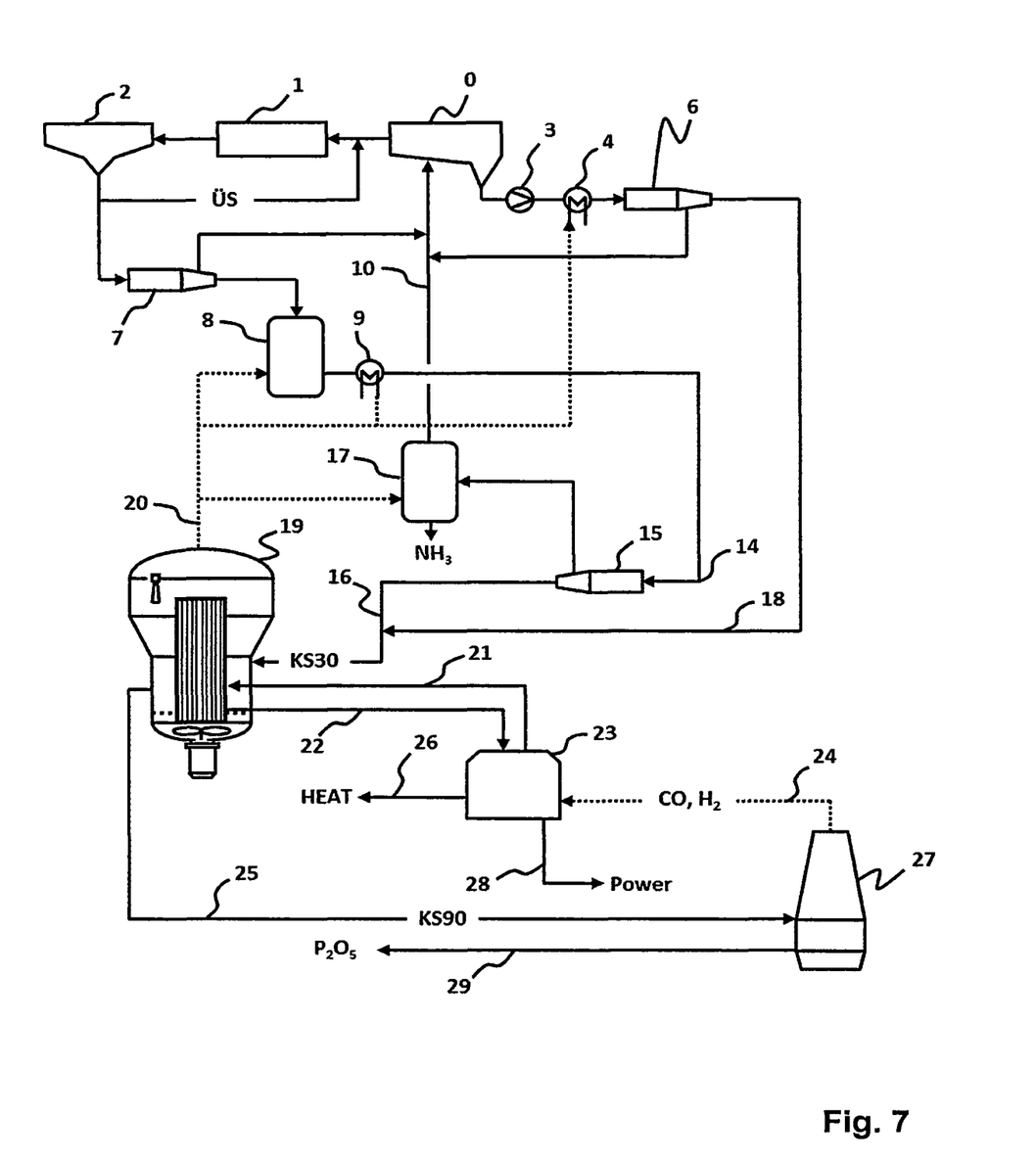
FIG. 7: an overview illustration of the construction of a sixth embodiment of a wastewater treatment plant according to the invention.

A sixth embodiment of the invention can be seen in FIG. 7. What is involved in this case is a markedly reduced and thus cost-effective procedure, which, however, places another additional procedure at its center. The MAP precipitation 12 in this case can occur prior to or after the dewatering 15. In this embodiment, the digestion tanks 5, 11 and the production of biogas or incineration gas, in addition to the associated line 24, are totally dispensed with.

Instead of this, a monoincineration 27 takes place by means of melt gasification in a metallurgical shaft furnace at 2000° C. for the production of phosphorus-rich slag (16.4% $P_2O_5$) as a further reusable substance 29. In this way, it is possible to obtain bioavailable phosphorus fertilizer $P_2O_5$, which is free of heavy metals and uranium. A post-incineration of the furnace gas of heat value then occurs for the generation of electrical energy and heat. This is also an advantage over the embodiments from FIGS. 2 to 6, since it is possible to recover another valued reusable material, as is targeted in legislative procedures to be expected in the future.

No sewage sludge is produced, but instead energy and heat are obtained, which leads to lowered transport costs. The sewage sludge is incinerated at the site of the wastewater treatment plant and thus serves as a heat and energy source for the drying process and for the entire wastewater treatment process. Moreover, it can also be utilized as the heat and energy source for external consumers of electrical and thermal energy. In the incineration, more energy is produced than can be consumed in the wastewater plant.

Additional heat for teleheating, vaporization, or heating systems is produced and there results a greatly simplified conduction of the process with reduced use of precipitating agents, such as, for example, polymers.

Because the digestion tanks are dispensed with, the investment costs are reduced in spite of the additional possibilities.

The carbon contained in the wastewater can be utilized completely in the digestion by incineration without prior production of $CO_2$.

Figure 8:
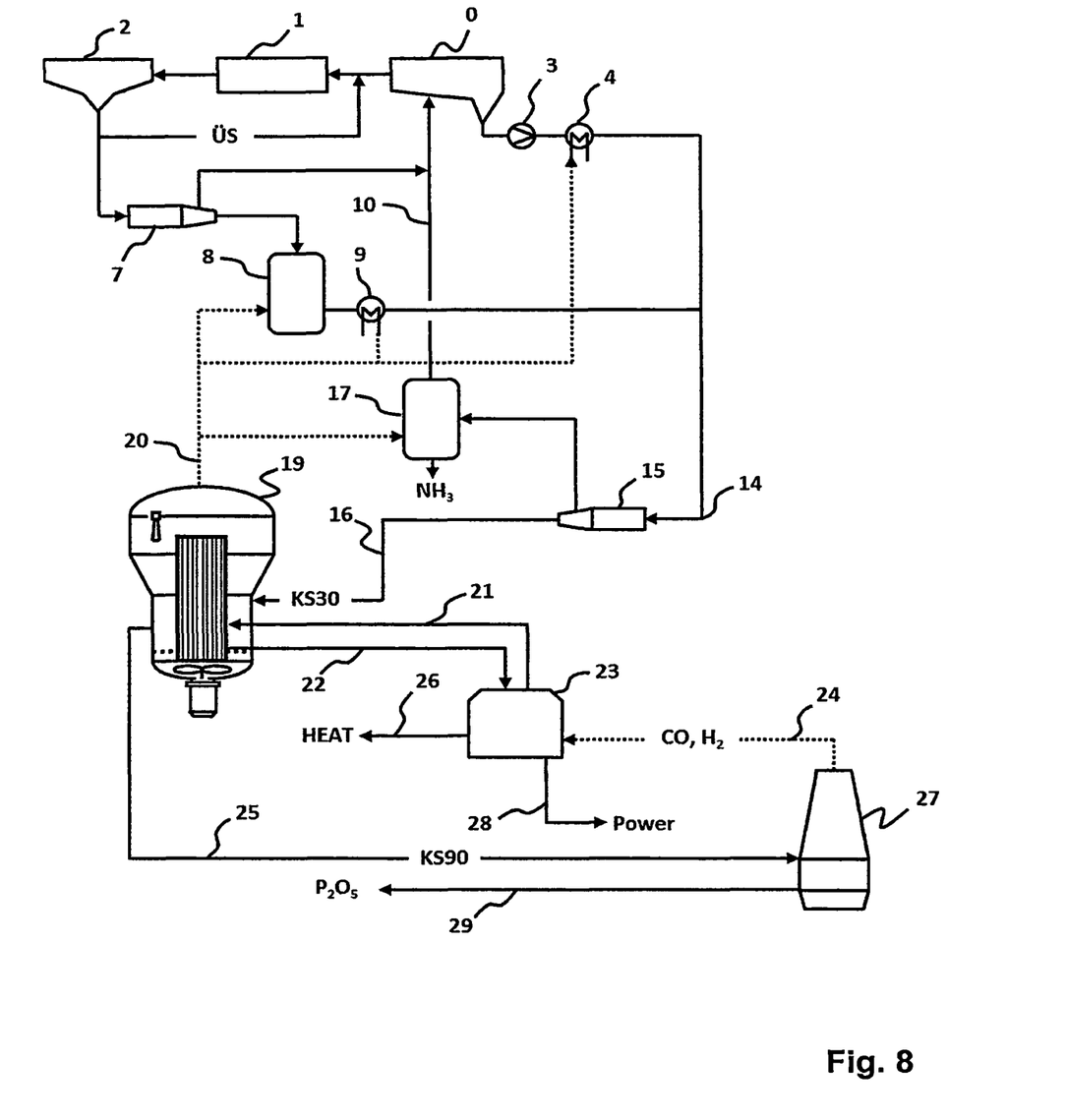
FIG. 8: an overview illustration of the construction of a seventh embodiment of a wastewater treatment plant according to the invention.

Finally, illustrated in FIG. 8 is a seventh embodiment, which differs from the sixth embodiment by the omission of a separate dewatering 6.

The additionally produced heat is fed to a distillative water treatment plant 31. The processed water W is discharged there.

Figure 9:
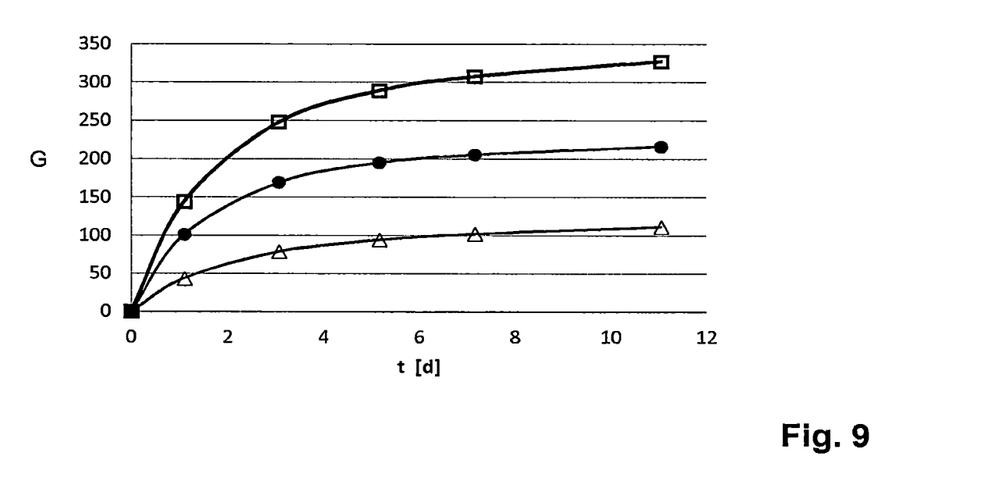
FIG. 9: a graphical illustration of the course of a hydrolysis with steam produced from tap water.

Illustrated in FIG. 9 is a trial result in schematic form. Plotted to the right* is the time t in days d, plotted towards the top** is the gas output G in normal liters per kilogram of organic dry residue, abbreviated NL/kg o TR. Illustrated is a time course of the gas output G of hydrolyzed sludge for a hydrolysis with steam produced from tap water, that is, in accordance with the procedure according to the invention. Three curves are plotted, namely, the biogas output as top curve, the methane output as the middle curve, and the carbon dioxide output as the bottom curve, each in the same units of magnitude.

* sic; plotted on the abscissa or x-axis.—Translator's note.
** sic; plotted on the ordinate or y-axis.—Translator's note.

Figure 10:
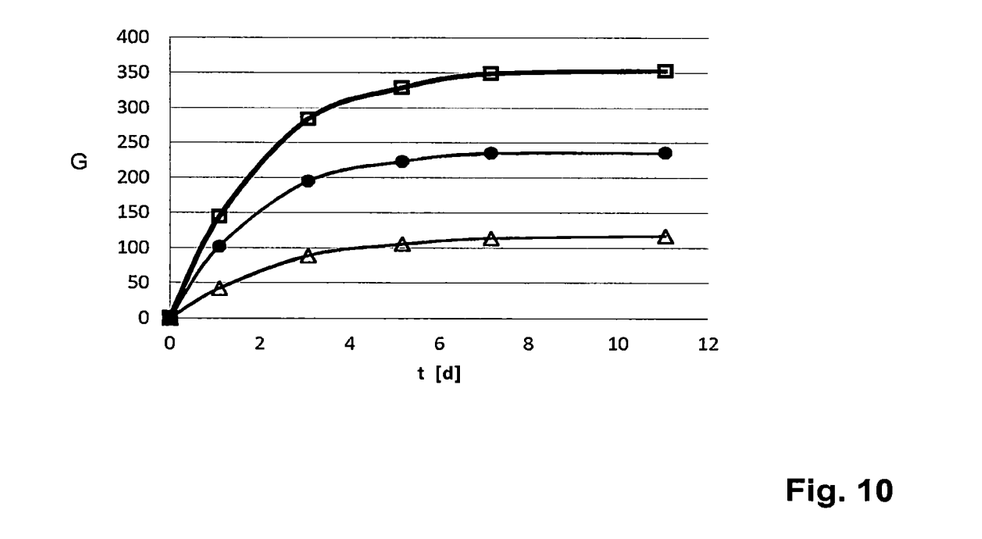
FIG. 10: a graphical illustration, similar to FIG. 9, of a hydrolysis with exhaust vapors from a steam drying process.

For comparison, the time course of the gas output of hydrolyzed sludge for a hydrolysis with exhaust vapors from steam drying in a procedure according to the invention is illustrated in very similar form in FIG. 10.

Here, too, the time t in days is plotted to the right* and the gas output G toward the top** in normal liters per kilogram of organic dry residue, abbreviated NL/kg o TR. The uppermost curve is the biogas output, the middle curve is the methane output, and the bottom curve is the carbon dioxide output.

* sic; plotted on the abscissa or x-axis.—Translator's note.
 sic; plotted on the ordinate or y-axis.—Translator's note The various curves in FIGS. 9 and 10** relate to a comparison test with a surplus sludge from a municipal wastewater treatment plant. In these comparison tests, all process conditions are chosen to be identical, that is, among others, the temperature, the hydrolysis period, the sludge sampling characteristic, the condensate quantity, and the quantity of steam. For hydrolysis, a condensate/exhaust vapors were added to a sludge sample from the steam drying and clean tap water or steam was added to another sludge sample. The hydrolyzed sludge samples each underwent a standardized digestion in batch digestion trials according to the pertinent guidelines by means of threefold determination.

The comparison of the results in FIGS. 9 and 10 then shows on the basis of the measured specific gas and methane production that the sludge sample hydrolyzed with exhaust vapors in FIG. 10 affords more gas or more methane appreciably faster. For a digestion period of about 7 days, approximately 15% more gas and methane are formed, for example. The conventional hydrolyzed sludge sample with steam from tap water requires approximately 5 to 7 days longer for the same quantity of gas; that is, for a digestion of the sludge hydrolyzed with exhaust vapors, the digestion tank in the present example can be designed to be approximately 40 to 50% smaller. These are substantial economic advantages, which are of surprise to the person skilled in the art.

Further analyses on the release of dissolved organic compounds confirm the above-mentioned results. Thus, for example, it is found on the basis of hydrolyzate samples that the hydrolysis with exhaust vapors leads to an approximately 9% higher degree of digestion.

LIST OF REFERENCE SYMBOLS 0. preliminary treatment
1. aeration
2. post-treatment
3. pump
4. heat exchanger—heating
5. digestion tank
6. dewatering assembly—primary sludge
7. preliminary dewatering assembly—surplus sludge
8. hydrolysis reactor
9. heat exchanger—cooling
10. line (return loading of the organic wastewater treatment)
11. digestion tank
12. MAP unit
13. line (digestion gas $CH_4$)
14. line (hydrolyzed digestion sludge or raw sludge)
15. dewatering stage
16. line (centrate of hydrolyzed surplus sludge)
17. stripping unit
18. line (centrate—primary sludge)
19. steam or vaporization dryer
20. feed line
21. line (waste heat—combined heat and power plant)
22. line (thermal oil/heating steam)
23. combined heat and power plant
24. line (incineration gas)
25. transport system (KS 90)
26. additional waste heat—combined heat and power plant
27. monoincineration
28. electric power
29. transport system (phosphorus slag)
30. microturbine or small turbine
31. distillative water treatment plant
32. conditioning stage
O overplus (surplus)
H waste heat
P power, in particular electrical power (electrical power generation)
W water
G gas output in normal liters per kilogram of organic residue, also NL/kg o TR
d days
t time
KS30=dry sewage sludge containing about 30% dry matter content
KS90=dry sewage sludge containing about 90% dry matter content
$P_2O_5$=phosphorus fertilizer
CO, $H_2$=incineration gas
$CH_4$=methane
$NH_3$=ammonia
☐ biogas output
● methane output
Δ carbon dioxide output

What is claimed is:

1. A method for wastewater treatment, in which at least portions of sewage sludge contained in the wastewater are subjected to a hydrolysis,
   in which the hydrolysis is carried out as a thermal hydrolysis,
   in which, after the step of the hydrolysis, a drying process takes place, is hereby characterized
   in that the drying process is a drying process operating with an excess pressure in steam, and
   in that at least parts of the steam formed in the drying process operating with excess pressure in the steam are fed to the portions of the sewage sludge in the thermal hydrolysis.

2. The method for wastewater treatment according to claim 1, further characterized
   in that the drying process is a fluidized bed drying process with excess pressure in the steam, and
   in that, during the drying process, constituents formed by the fluidized bed drying process are fed with the steam to the portions of the sewage sludge in the thermal hydrolysis.

3. The method for wastewater treatment according to claim 1, further characterized in that a digestion is subsequently carried out with the portions of the sewage sludge subjected to the thermal hydrolysis.

4. The method for wastewater treatment according to claim 3, further characterized in that a separate digestion of surplus sludge, on the one hand, and primary sludge, on the other hand, is carried out.

5. The method for wastewater treatment according to claim 3, further characterized in that a mechanical dewatering of the sewage sludge subjected to the digestion occurs between the step of digestion and that of the drying process.

6. The method for wastewater treatment according to claim 1, further characterized in that a wastewater treatment without digestion is provided, and in that the dried sewage sludge is fed to a monoincineration and resulting gases of high heat value are utilized in a post-incineration for steam generation for a high-temperature drying process.

7. The method for wastewater treatment according to claim 1, further characterized in that a part of the steam formed during the drying process is employed for a steam stripping of ammonia from separated water of the hydrolyzed and digested sewage sludge.

8. The method for wastewater treatment according to claim 1, further characterized in that a part of the steam formed during the drying process is employed for mechanical sewage sludge dewatering and/or for operation of microturbines or small turbines and/or for enrichment of salt-containing water.

9. The method for wastewater treatment according to claim 1, further characterized in that a phosphorus recovery process is carried out from sludge water removed during dewatering or from the sewage sludge fed to the dewatering.

10. The method for wastewater treatment according to claim 1, further characterized by exclusion of oxygen in the drying process.

11. An arrangement for wastewater treatment with a hydrolysis device for hydrolytic treatment of sewage sludge, and
    with a dryer for the drying of sewage sludge,
    is hereby characterized
    in that the dryer is a dryer operating with excess pressure in a steam range,
    in that a feed device for feeding the steam, which forms in the dryer operating with excess pressure in the steam range, to the hydrolysis device, in that the hydrolysis device is designed such that it mixes fed steam together with the sewage sludge, and in that the dryer is one of a steam dryer, a vaporization dryer and a fluidized bed dryer.

12. The arrangement for wastewater treatment according to claim 11, further characterized in that the dryer is a fluidized bed dryer, and in that, during the drying process, constituents formed by the fluidized bed drying are fed with the steam to portions of the sewage sludge in the thermal hydrolysis.

13. The arrangement for wastewater treatment according to claim 11, further characterized in that at least one digestion tower, is provided, which is attached indirectly or directly to the hydrolysis device.

14. The arrangement for wastewater treatment according to claim 13, further characterized in that a dewatering stage is provided, which is connected indirectly or directly to the digestion tank or tanks.

15. The arrangement for wastewater treatment according claim 13, further characterized in that at least two digestion tanks are provided, which are provided, on the one hand, for excess sewage sludge and, on the other hand, for primary sludge.

16. The arrangement for wastewater treatment according to claim 11, further characterized
in that a wastewater treatment without a digestion tank is provided, and
in that dried sewage sludge is fed to an incineration installation, in particular a monoincineration installation or a waste incineration installation or a melt vitrification installation and resulting gases of high heat value are utilized in a post-incineration for steam generation for a high-temperature drying and/orelectrical power generation.

17. The arrangement according to claim 11, further characterized in that a stripping unit for stripping ammonia is provided, which is connected to the dryer.

18. The arrangement for wastewater treatment according to claim 11, further characterized in that a phosphorus recovery stage is provided.

19. A system for wastewater treatment comprising, a hydrolysis device for hydrolytic treatment of sewage sludge, a dryer for the drying of the sewage sludge, said dryer configured to operate with excess pressure in a steam range, and a feed line fir feeding steam to the dryer, said hydrolysis device configured such that it mixes the fed steam together with the sewage sludge.

20. The system for wastewater treatment according to claim 19, wherein the dryer is a fluidized bed dryer, and in that, during the drying, constituents formed by the fluidized bed dryer are fed along with the steam to portions of the sewage sludge in the hydrolysis device, and further comprising at least one digestion tank which is coupled with the hydrolysis device.

21. The system for wastewater treatment according to claim 20, further including a dewatering stage which is coupled with the digestion tank or tanks, and in that at least two digestion tanks are provided, which are provided, on the one hand, for excess sewage sludge and, on the other hand, for primary sludge, and in that the dried sewage sludge is fed to an incineration installation, in particular one of a monoincineration installation, a waste incineration installation, and a melt vitrification installation and resulting gases of high heat value are utilized in a post-incineration for steam generation for a high-temperature drying and/or electrical power generation.

* * * * *